(12) United States Patent
Nikander (10) Patent No.: US 7,290,405 B2
(45) Date of Patent: Nov. 6, 2007

(54) METHOD AND APPARATUS FOR CONDUCTING HEAT TO A GLASS SHEET

(75) Inventor: Risto Nikander, Tampere (FI)

(73) Assignee: Feracitas Oy, Tampere (FI)

( * ) Notice: Subject to any disclaimer, the term of this patent is extended or adjusted under 35 U.S.C. 154(b) by 596 days.

(21) Appl. No.: 10/483,179

(22) PCT Filed: Jul. 10, 2002

(86) PCT No.: PCT/FI02/00622

§ 371 (c)(1),
(2), (4) Date: Jan. 9, 2004

(87) PCT Pub. No.: WO03/006390

PCT Pub. Date: Jan. 23, 2003

(65) Prior Publication Data

US 2004/0148969 A1    Aug. 5, 2004

(30) Foreign Application Priority Data

Jul. 11, 2001  (FI) ................................. 20011512
Dec. 21, 2001  (FI) ................................. 20012568

(51) Int. Cl.
*C03B 27/00* (2006.01)
(52) U.S. Cl. .............. 65/119; 65/273; 65/356
(58) Field of Classification Search .................. 65/111, 65/114, 104, 273, 274, 349, 350, 356, DIG. 4, 65/119; 219/470
See application file for complete search history.

(56) References Cited

U.S. PATENT DOCUMENTS 3,326,654 A * 6/1967 Plumat ......................... 65/111
3,351,687 A   11/1967 Thome et al.
3,581,679 A * 6/1971 Jansen et al. ............... 432/199
4,534,780 A   8/1985 Cemin
5,195,673 A   3/1993 Irish et al.
5,368,624 A   11/1994 Lehto et al.
6,470,711 B1 * 10/2002 Jarvinen et al. .............. 65/273

FOREIGN PATENT DOCUMENTS

EP    1 050 731    11/2000

* cited by examiner

*Primary Examiner*—Carlos Lopez
(74) *Attorney, Agent, or Firm*—Stites & Harbison PLLC; Douglas E. Jackson

(57) ABSTRACT

Method for transferring heat onto a glass in the furnace meant for heat treatment of glass, into which glass is transferred on a path of rollers, furnace heated by resistors (5) located inside of the furnace, the radiation heat directed onto the glass and convection heat transferred by means of a blower and air onto the glass. In the method the glass being heated and roller space (8) are separated by a wall (9) from air circulation space (3, 7), by means of blowers the air circulation is arranged to heat above and/or below the glass by means of the first chamber (7) and second chamber (3), wherein air is sucked by the blower from the first chamber and blowed into the second chamber, wherein air circulation is conducted from the vicinity of the glass and from roller space (8) through an opening in the wall (9) into vertical channels (7C2) and further into the first chamber and chamber the glass is directed onto the glass through nozzles (6).

14 Claims, 6 Drawing Sheets

METHOD AND APPARATUS FOR CONDUCTING HEAT TO A GLASS SHEET

KNOWN ART

Radiation Heating Furnaces

Traditionally glass tempering furnaces have been heated by radiant heat, heaters made of electrical resistances. In some cases the resistance heaters radiate directly on to the glass. In other cases the resistances heat the radiation plates, which, in turn, radiate the heat on to the glass. These radiation heating furnaces are cheap, but are not good for low emissivity and reflective glasses, because radiation is reflected from the (upper) surface of the glass and the bottom side of the glass is heating quicker causing quality problems Another handicap of radiation heating furnaces is, that when the furnace is empty, the rollers get very hot. As the glass load enters into the furnace, the hot rollers heat the bottom surface of the glass more quickly, than the glass top surface is heated by top heaters. This causes larger thermal expansion on the bottom of the glass and glass edges bend up so that the glass central areas alone touch the rollers. These parts are thus subjected to higher surface pressure and they deteriorate, this damage being called "white haze". Also overheated rollers break glass. One attempt to eliminate this problem is Finnish patent 71117, which is helpfull but naturally not effcient and moreover difficult to control. One of the earliest means to reduce this damage is so called heating balance as described in German patent DE 31 36 107 C2. This gives small convection on the top surface of the glass thus increasing its heating speed and balancing the extra heat given from the hot rollers. Also Finnish patents 97378 and 100596 refer to this same problem.

With the radiation heating furnace focusing of radiation on the glass load is quite critical for the proper heating of the glass(es). Furthermore, in those areas, where glass load is not oscillating, the rollers tend to heat to a higher temperature. Overheated rollers in some areas and lower temperature rollers in other areas can cause uneven heating of the subsequent glass load. This is why sensing devices have been developed to measure geometry of glass load on the loading table before load enters into the furnace. The heating configuration is adjusted accordingly. The German company WSP brochure and Finnish patent 100526 propose solutions to this kind of problem.

With the increase of coated, reflective and low emissivity glasses the demands for the tempering furnaces are increasing and various methods have been developed to respond the needs, because the methods such as German patent DE 31 36 107 C2 are adequate only for eliminating "white haze". For low emissivity glasses these methods are insufficient, as amount of convection is low.

Another problem for the radiation heating is low capacity. This is particularly true with low emissivity glasses. For low emissivity glasses convection heating is ideal, as convection, unlike radiation, is not affected by glass surface treatment.

Double Chamber Furnaces

A more radical improvement is to make 2 heating chambers into a tempering furnace, the first one of which is convection heating chamber. Example of this furnace type is European Patent Application EP 0 721 922 A1. This convection preheating chamber has relatively low temperature. As the glass curving problems, "white haze", is higher in the beginning of the heating period, the preheating furnace with convection is helpful.

This convection preheating chamber is quite useful for low emissivity glasses, as the convection heating is efficient also for heat reflective (upper) surface of the glass. Thus balance between top and bottom temperature of the glass surfaces can be maintained. Besides, roller temperature does not get very high due to the absense of radiation.

However, the second heating chamber is still the radiation heating furnace with radiation heating characteristics and problems. Therefore this double chamber design only partially reduces the problems.

Two furnace chambers are different, so furnaces are more complicated, more expensive and more troublesome to maintain. Furthermore, double chamber furnaces need more installation space being some 25% longer than single chamber furnaces. Due to the low temperature in the first heating chamber the capacity advantage is not high. Although the design is about 10 years old, only few furnaces of this type have been sold.

High Convection Furnaces

There are also furnaces, in which the glass is heated as much as possible by high temperature convection air. An example of this is European Patent publication 0 649 821 A1. In this furnace the glass is heated in one chamber from start of the heating period until it reaches the tempering temperature.

The air is heated by heaters which are either before or after the hot air blowers. The air is blown onto the glass through nozzle blocks, which extend from one side of the furnace to the other side of the furnace. Nozzle blocks are at the intervals of about 100-120 mm, according to the roller spacing. In order to have equal pressure all over the area and as the furnaces are normally 4-5 meters long, there must be blowers preferably no more than 1.5 m intervals at top and at bottom, on 2 sides of the furnace. This big number of blowers, large quantity of air ducts, manifolds and nozzle blocks make the furnace expensive.

There are typically 12 hot air blowers, there are also 12 heater blocks, the temperature of which can be controlled individually. This, however, is not sufficient, as naturally glass loading configurations do not follow this kind of patterns. Especially glass loads are not normally full width of the furnace and this furnace does not give any temperature control over the width of the furnace. With this kind of furnace it is not possible to create any kind of "heating profile", in other words to adjust higher heater set point on the areas, where more heat is needed. Such areas are, for example, central areas of the glass load and areas where there may be holes and notches in the glass. Also, if the furnace is used for bending purposes, heating profile may be needed to heat tight bend areas into higher temperature.

Furthermore, this kind of convection system with low thermal storing capacity of heating blocks is unstable in operation as changes in the temperature of the convection air vary quickly. The system has not proven successful and some furnaces delivered have been taken out of service.

Combined Radiation and Convection Heating

Another recent method is described in PCT/EP97/03407 publication. This method is more combination of conventional indirect radiation heating method and so called "high convection" furnace.

Consequently in this furnace, as also in radiation heating furnace, the heating resistances are lengthways in the furnace. Thus combined heater casing/nozzle blocks are naturally also lengthways in the furnace. The upper nozzle block/heater casing combinations have rectangular radiation plates on the bottoms of the casings, facing the glass. As most of the area above the glass is covered by these radiation plates, the only way to have a sufficient convection is to machine air nozzles into the radiation plates. The convection air also "flushes" top side of radiation plates cooling them down. Thus actual radiation on the other, (bottom) side of radiation plate is reduced to low level and radition plates mainly function as expensive nozzles only. Sealing problems are greater than in high convection furnaces, because of connection are needed between the radiation plates and air manifolds.

The convection air pressure needs to be uniform along the full width and length. Therefore the individual nozzle blocks need to be spaced closely and need to be limited length. Due to this the hot air blowers must not be at too long distance from each other. Otherwise the pressure at the ends of the nozzle blocks would be reduced. There are several standard lengths of the furnaces and due to this there must be different lengths of nozzle blocks, which must be connected to each other. This results in different capacities of hot air blowers, which must be run at speed which gives equal pressure all over. This makes design complicated and expensive mechanically, electrically and from the control point of view, even more than high convection furnaces.

In this furnace the radiation plates are at the distance of about 60 mm from the glass and lengthways to the furnace. Therefore, there is a gap between the consecutive radiation plates and heaters. If gap is increased, the glass along the centrelines of the heaters is getting hotter than between the heaters. Too big C-C distance between the heaters would also cause difficulties to arrange proper convection between the heaters. Therefore, the heaters over the width of the furnace must be at small spacing, typically at 120 mm.

This furnace, similarly to other convection systems earlier described, also has big number of hot air blowers, manifolds, air ducts and nozzle blocks. Furthermore, this furnace has heaters built into nozzle blocks with wiring into them, and other complications. All this results in a lot of hot air leaking losses and energy waste. Pressures vary due to the leakages causing variations in heating conditions and difficulties in control. Each of (normally) 12 hot air blowers transfer heat out of the furnace via shafts, mounting and cooling system thus increasing energy waste and operating costs. Big number of components increase maintenance costs.

Also, the above described design results in extremely expensive hot resistant sheet metal works and radiation plates, great number of components, such as hot air blowers, their drives, wiring and electrical components, cooling systems, sealing systems, big assembling works, and subsequently in high manufacturing expenses.

Another effort to build this type of furnace is described in Finnish patent application 19992359. This is actually radiation heating furnace with so called "heating balance" system, which originates from Finnish patent 62043. However, this system takes "heating balance" air from inside of the furnace thus avoiding the waste of energy via hot air exiting from the furnace. Also, this system uses much larger air quantity and is therefore more effective. However, it circulates air in such a way, that convection air is blown from distribution pipes, mounted on 2 sides of the furnace, into blowing pipes, which run across the furnace. Thus convection air runs from both sides of the furnace into the center of the furnace obviously being heated by the radiation from the resistances during this run. Due to this the air is discharged from blowing pipes into the furnace at lower temperature at sides and with increasing temperature towards the centerline of the furnace, with maximum temperature at the center. Thus in this furnace only the radiation heaters can give wanted heating profile, but the convection air is heated as described. This is obviously serious handicap. As loading configurations and emissivity of glasses vary, the convection air should respond to these changes, too.

Besides, small nozzles from distance, even with relatively high pressure air, cannot be very effective. In addition compressing of very hot air into high pressure is not easy task even with modern technology.

This system does not take care of roller temperature control either. It is widely known, that the glass from bottom side is heated mainly by conduction and radiation from rollers. Very little by radiation from radiant heaters. This is natural, because approximately 75% of surface area below the glass is covered by roller and radiation cannot reach glass. Rollers have been heated traditionally by radiation, (also from top, especially when furnace has been empty), and somewhat with air movement, light convection. This has resulted with overheated rollers in the beginning of heating period, causing glass breakage and white haze, as earlier described.

Effective heating of glass by convection from below the rollers is difficult because of roller diameter of about 100 mm and just about 25 mm gap between the rollers. There should be a space between and under the rollers to allow broken glass to fall down. One example of trying to solve bottom side heating of glass is described in patent EPO 0786437, which includes nozzles almost under the rollers and blowing into the gap between the rollers aiming at glass. This is naturally helpful. If this works as described, it leaves the roller temperature uncontrolled, although it should be the main task to avoid overheating with empty furnace and maintaining sufficiently high temperature during the course of heating. It is obvious, that this system also gives high turbulence on rollers and is therefore beneficial also this way.

The most practical way to maintain the roller temperature stable would be to blow correct temperature air onto the rollers. The rollers will, in turn, heat the glass correctly. Not too quickly in the beginning and not too slowly after some of the heating time has elapsed. The configuration and temperature of convection air can be best controlled by controlling the bottom heaters so, that they follow switching or heating intensity control of top heaters, exactly as is the case with well known radiation heating furnaces.

THE PRESENT INVENTION

The present invention gives practically all the benefits of the earlier described systems and eliminates handicaps and reduces operating and manufacturing expenses of the known art with the following design features;

1. The convection air is produced in two large chambers, later called "air distribution chambers". One in the top of the furnace and the other in the bottom of the furnace. As the chambers are with relatively large cross section, the convection air pressure will be uniform from one end of the furnace to the other end of the furnace even if only one or two hot air blowers are used for top and bottom of the furnace. Furthermore, in addition to saving in the number of hot air blower, (going typically from 12 to 4 blowers), there is saving in number of drives and cooling systems required for the blowers. Also, almost all duct and manifold work is eliminated. Nozzles can be simply punched into a partition wall separating pressure chamber from roller space. Furthermore, the furnace frame is simpler. The return air suction channels 7c1 and 7c2 act as needed reinforcements of air distribution boxes. As a result this furnace is much cheaper to make.

The design as per present invention reduces hot air leakage and cooling requirements and being simpler maintenance requirements saving in operating costs.

2. The convection air is heated with the field of resistances, arranged lengthways inside of the air distribution chambers. The nozzles are arranged in rows across the full width of the chambers. The heaters are not strictly separated from each other by heater casings, as is the case with the traditional indirect radiation heating furnaces and in the furnace described in PCT/EP97/03407 publication. This makes it possible to increase the spacing of the heaters. Still it is possible to maintain the optimum heating of the glass along the width of the furnace, (even heating, where required and heating profile, where required). Less heaters, with higher power each, reduces manufacturing, wiring and electrical component costs.

Alternatively the reduction in power of lengthways heaters can be used to increase the number of crosswise heaters, as described in the following chapter, thus giving better controllability of the heating profile along the length of the furnace.

3. In the present invention, there can be heaters crosswise the furnace and these heaters are controlled by thermocouples, which sense the glass load over the length of the furnace. Thus a heating profile is created automatically also over the length of the furnace. With the control system described for the present invention there is no need to make any special systems to measure the glass load on the loading table and adjust the heating accordingly, as is the case with prior art. The control system described in this article and together with the air circulation, effectively eliminates overheating of empty areas of the furnace and rollers, which is typical to the radiation heating.

4. In the present invention the increase of the convection air quantity reduces the radiation effect very little, because the convection air does not "flush" much radiation areas or heaters. This is one of the problems with the furnace described in PCT/EP97/03407 publication. Furthermore, the heaters crosswise to the furnace almost merely heat the convection air, which, even more, helps to adjust the relative proportion of the convection and radiation heating.

5. The bottom convection air jets below the rollers are arranged in such a way, that air jets coming from the bottom nozzles give convection directly on rollers. Thus the air jets effectively stabilize the roller temperature, (reduce the roller overheating in empty areas of the furnace and keep them hot in the areas where glass is being heated at later stages of the heating process). On the bottom side convection 6. requirement is less than above, because reflective coating is only on the topside where the heating should be performed by convection. Partition wall between the air distribution boxes and roller space can be just flat plate with nozzles and air return holes punched into them, leaving desired open space under the rollers.

DESCRIPTION OF DRAWINGS OF THE PRESENT INVENTION

Figure 1:
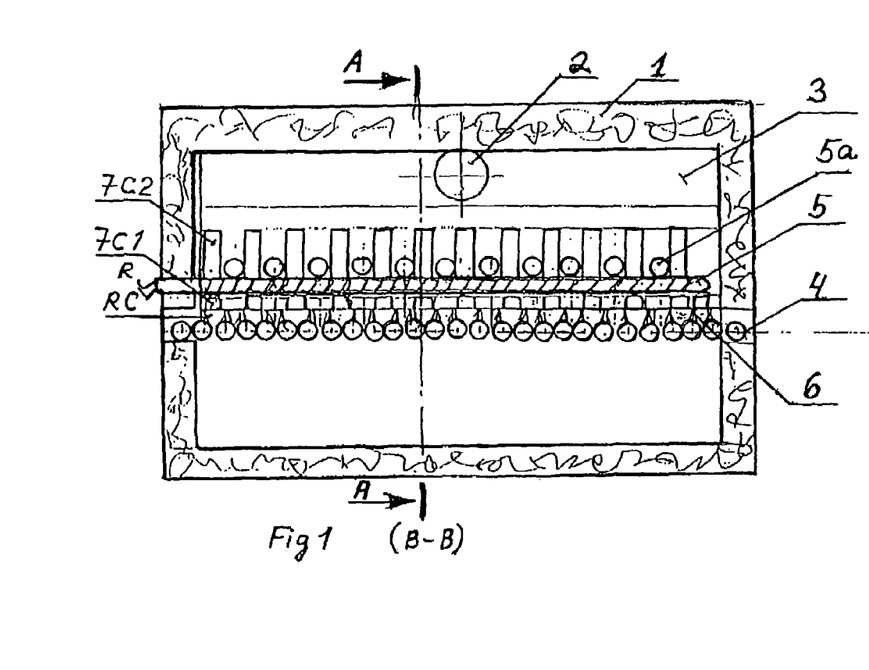
FIG. 1 shows side view of the novel furnace

FIG. 1 shows glass heating furnace side view cut along the length of the furnace with rollers 4, longitudinal heaters 5 and crosswise heater 5a installed inside of the air distribution box 3, (second chamber). The drawing also shows how convection air nozzles rows marked with number 6. In one end of the furnace there is a loading door in the other end unloading door. Loading table, tempering section and unloading table are excluded from the drawing.

Figure 2:
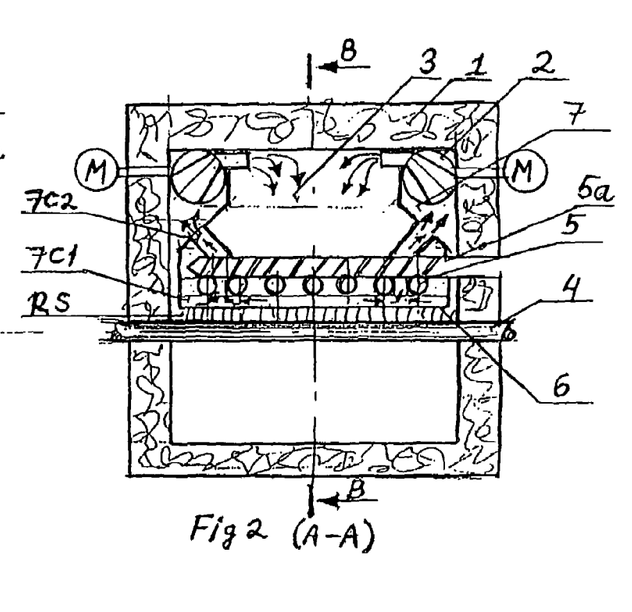
FIG. 2 shows section A-A of FIG. 1

FIG. 2 shows section A-A of FIG. 1 with air suction channels 7c1 and 7c2 leading into suction spaces 7 on two sides of the furnace and back to the hot air blowers 2. This arrangement can be used also for the bottom convection of the furnace, upside down, not shown in FIG. 1 and FIG. 2.

Figure 3:
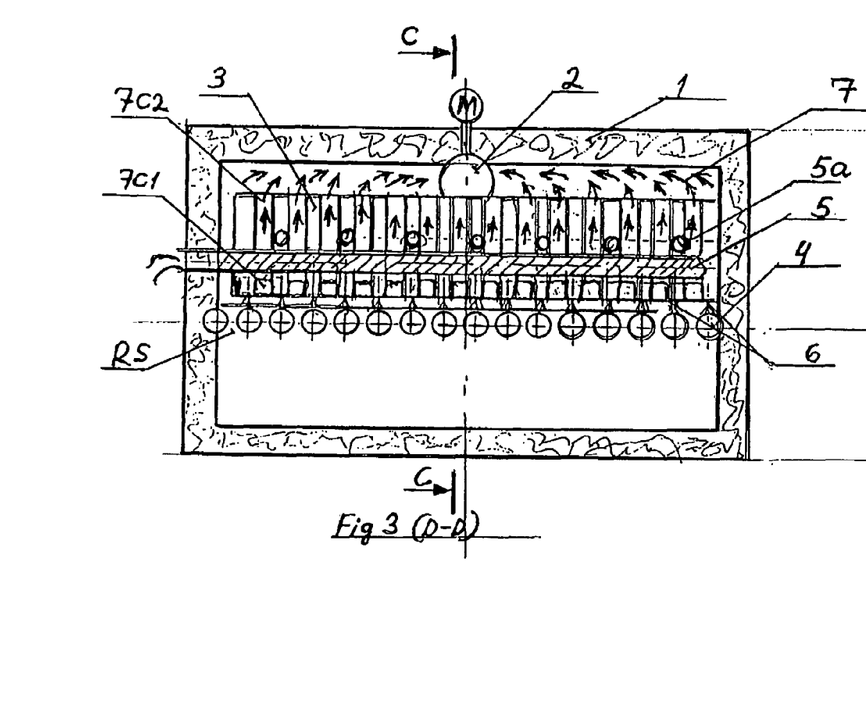
FIG. 3 shows another embodiment of the novel furnace
Figure 4:
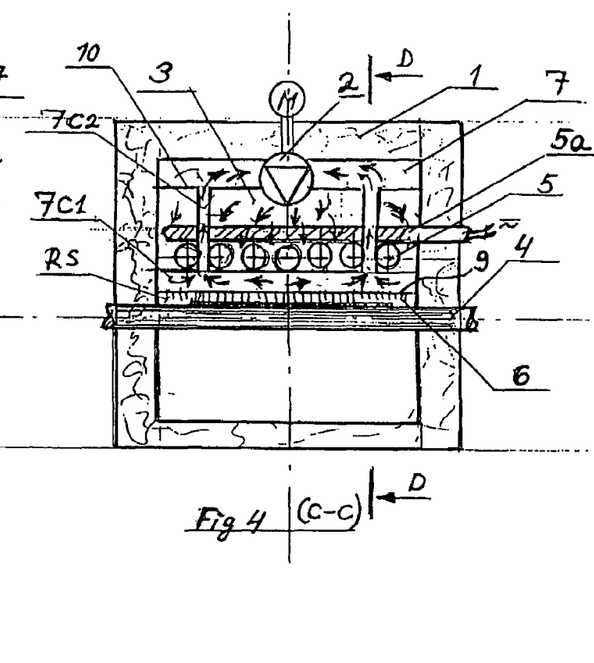
FIG. 4 shows section C-C of FIG. 3

Since topside convection needs to be high, larger hot air blowers are useful. Another possibility to collect convection air from roller space is shown in drawings 3 and 4, where similar air suction channel 7c1 are used. However, in this arrangement air suction space 7 is on the top of the furnace and channels 7c2 lead directly over there. Now it is possible to use for example one blower M in the center of the furnace or 2 blowers M at suitable distance from one to another along the centerline of the furnace. This arrangement cannot be properly used on the bottom side, because the blower(s) cannot be well located under the furnace.

It is also possible to combinate suction channels 7c2 as presented in FIGS. 1 and 2. This could be beneficial solution for air exit and for the construction of distribution boxes, (first and second chambers).

Figure 5:
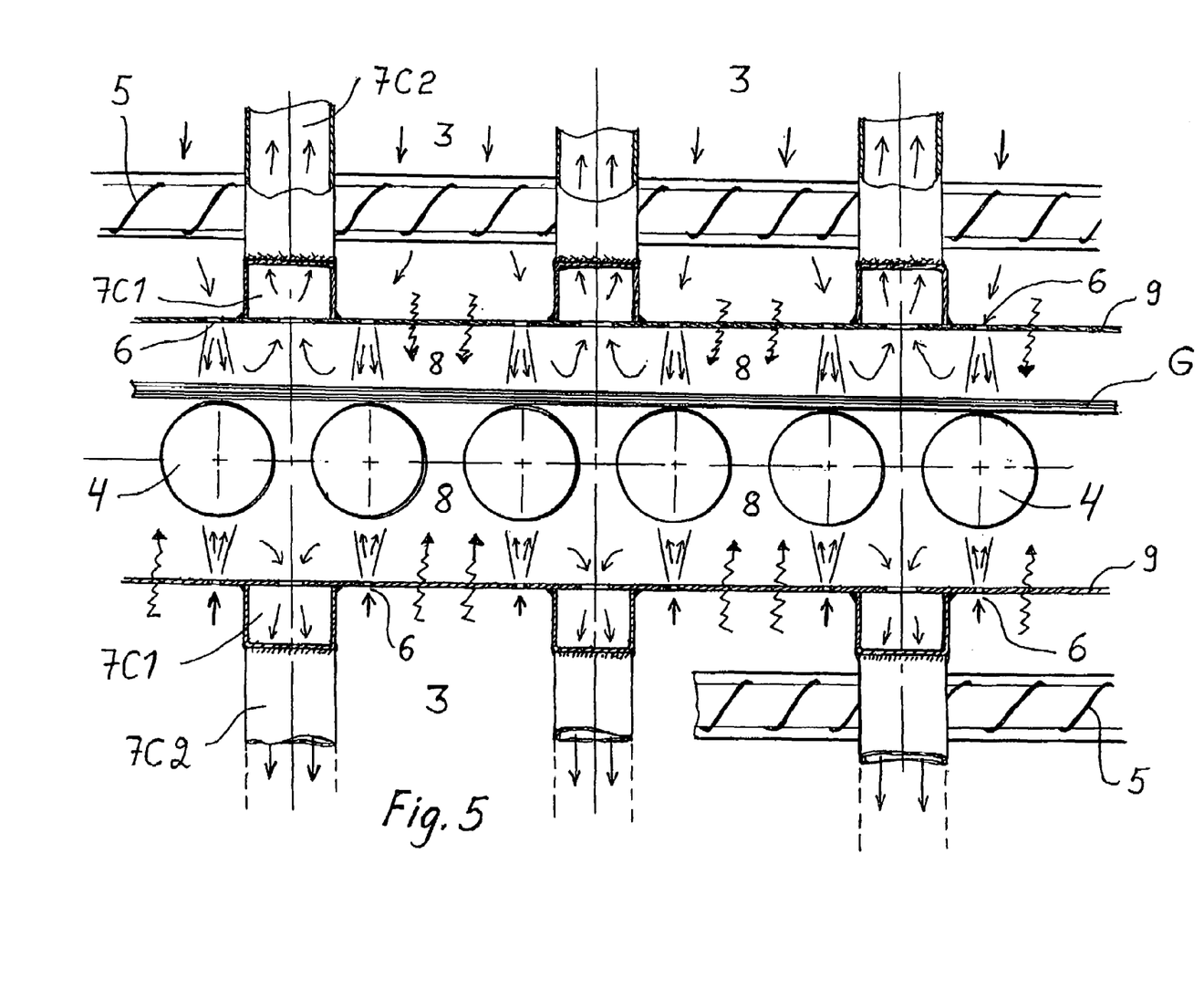
FIG. 5 shows details of the distribution of the air inside of the furnace

FIG. 5 shows detail of furnace with roller cross section has reference number 4, glass by letter G, air distribution boxes by number 3, (top and bottom), nozzles 6, (top and bottom) and air suction channels 7c1 and 7c2, also top and bottom. The air circulation in all drawings is shown with small arrows. Suction nozzles leading from roller space into suction channels must have open area approximately 5 times the open area of nozzles. They must be over the full width of furnace, too, similarly to the nozzles, 6. Both, nozzles and holes are openings arranged in rows into partition wall 9.

Figure 6:
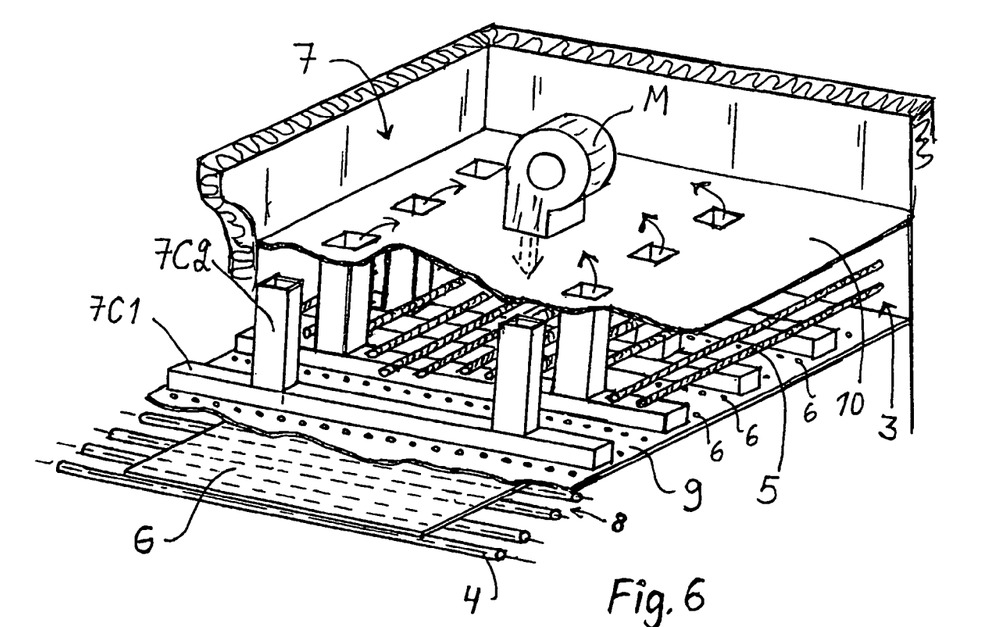
FIG. 6 shows details of the of the air distribution inside of the upper parts of the furnace

FIG. 6 shows a partial view of the upper part of the furnace, which also have been shown in FIG. 3 and FIG. 4. Upper partition wall, plate 10, divides two separate chambers, first chamber 7 and second distribution chamber 3 above roller space 8 and distribution wall 9. Heating elements have been located into second chamber 3. Vertical channels 7C2 are lead to the first chamber through second chamber, 3.

Figure 7:
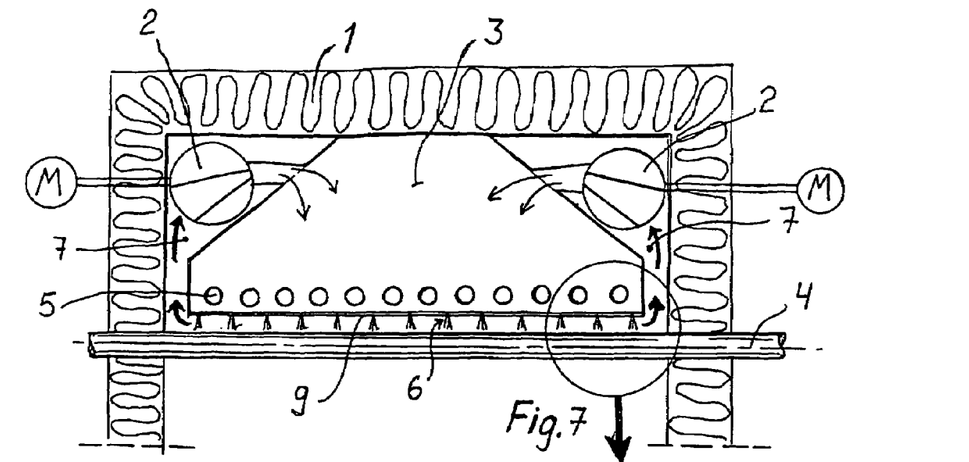
FIG. 7 shows one method of conducting the heating air, seen from the end of the furnace

FIG. 7 describes how the return air from the glass and rollers 4 is lead in the space under the wall 9 to the sides of the furnace 1, from which it returns into the first chamber 7. There can be several chambers 7, as in this case. Second chamber 3 can be continuous from one end of the furnace to the other end of the furnace of divided into sections. The heating resistances 5 are in chamber 3.

Figure 8:
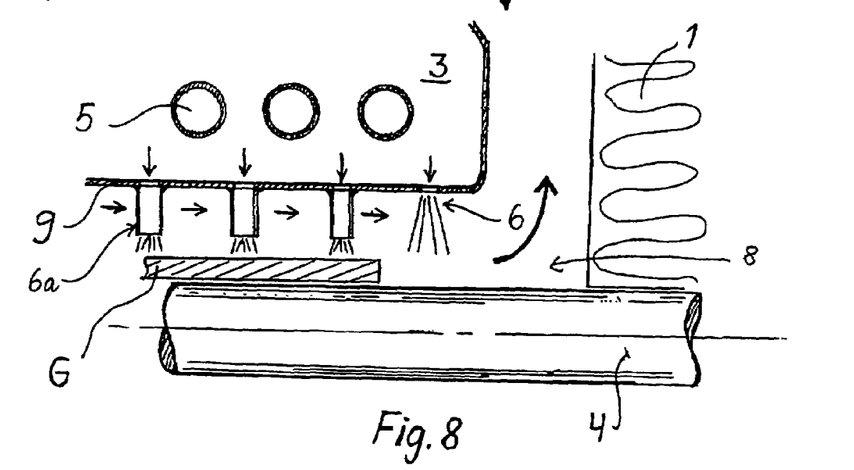
FIG. 8 is enlargement of FIG. 7

FIG. 8 shows enlargement of the structure shown in FIG. 7. The partition wall 9 can be furnished with simple blowing openings 6 or nozzles, 6a. When using nozzles 6a, the air can better return to the sides without being mixed with convection air.

Figure 9:
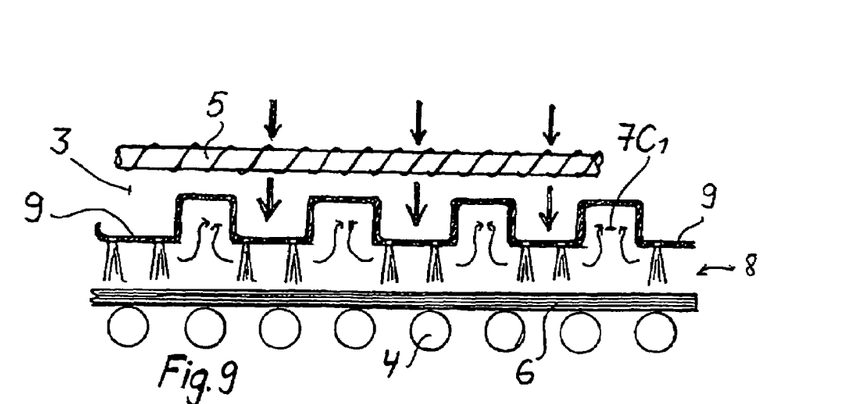
FIG. 9 shows corrugated wall with resistances above it

FIG. 9 shows the corrugated wall 9 so that the air returning from the glass can easily be conducted in channels 7C1 to the sides of the furnace without being excessively mixed with the convection air.

Figure 10:
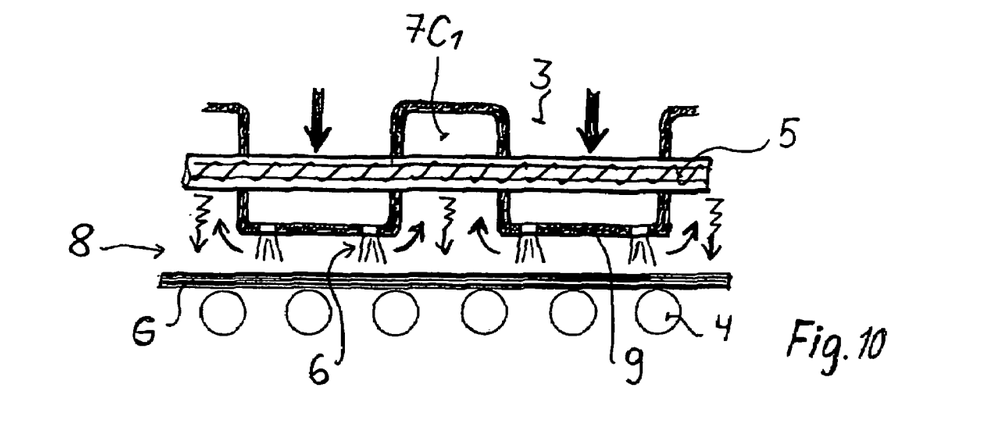
FIG. 10 shows corrugated wall with resistances in the wall structure

FIG. 10 shows corrugates partition wall 9 so that the heating resistances 5 are combined into the wall structure. With this solution also part of the surface of the resistors 5 radiates directly on to the glass, parts radiates onto the partition wall heating it and part of the surface of the resistors heats the air blown by the resistors.

Figure 11:
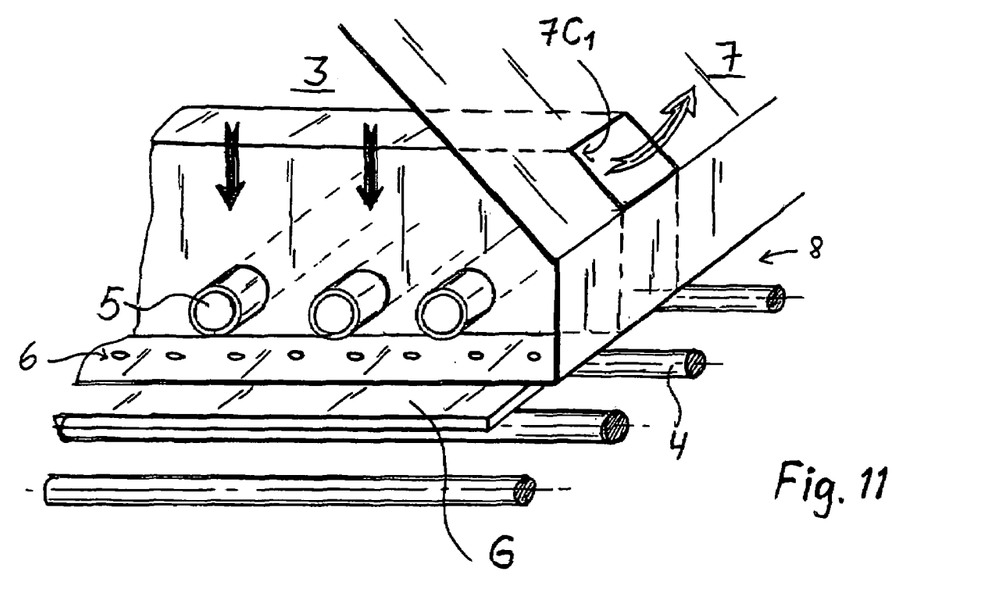
FIG. 11 shows angular view of detail of FIG. 10

FIG. 11 shows inclined view of the structure shown in FIG. 10 near to the side of the furnace, in which the return air exits from the horizontal channel 7C1 and continues into the first chamber 7.

Above and below the glass it is possible to make the mirror images of each other, but the can also be made different of each other.

The invention claimed is:

1. A method for transferring heat onto glass in a furnace used for thermal treatment of the glass, comprising the steps of:
   transferring the glass into the furnace on a path of rollers located in a roller space,
   heating the glass by heating elements located inside of the furnace, the heating step including
      transferring radiant heat of the heating elements onto the glass and
      transferring convective heat onto the glass by air blown through blowers, said convective heat transferring step further including
      separating, by a partition wall, the glass being heated in the roller space from an air circulation space,
      separating the air circulation space into a first suction chamber and a second pressure chamber, and
      circulating air to heat a surface of the glass with the blowers by (a) sucking air from the first suction chamber and blowing the air into the second chamber, (b) leading the air from the second pressure chamber onto the glass in the roller space, and (c) leading the air from the glass in the roller space into the first suction chamber.

2. A method according to claim 1, wherein said circulating step includes leading of the air from the second pressure chamber onto the glass via one of openings in the partition wall or nozzles.

3. A method according to claim 1, wherein said circulating step includes leading of the air from the roller space through the partition wall and via channels into the first suction chamber.

4. A method according to claim 1, wherein said circulating step includes leading of the air from the roller space along channels in the partition wall and around sides of the partition wall into the first suction chamber.

5. A method according to claim 1, wherein said circulating step includes leading of the air from the surface of the glass in the roller space into collection channels provided in the partition wall through openings leading into the channels, and then leading the air in the collection channels via vertical channels into the first suction chamber.

6. A method according to claim 1, wherein said circulating step includes
   blowing of the air onto the glass in the roller space through blow openings provided in the partition wall leading into the second pressure chamber, and
   sucking of the air from the roller space through suction openings in the partition wall leading into the first suction chamber, and
   wherein the partition wall is located between 30-90 mm from the surface of the glass.

7. A method according to claim 1, wherein said heating step includes, for heating of the air lead from the second pressure chamber onto the glass, locating of the heating elements in the second pressure chamber.

8. A thermal treatment furnace for glass, comprising:
   a paths of rollers for transferring the glass into a roller space of the furnace,
   heating elements for heating the glass in the roller space by radiant heat from the heating elements and further by convection,
   an air circulation space having a blower for blowing heated air towards the glass in the roller space,
   a partition wall which separates the glass being heated in the roller space from the air circulation space,
   the air circulation space including a first suction chamber and a second pressure chamber so that the blower is arranged to suck air from the first suction chamber and to blow air into the second pressure chamber, where the blown air is then blown onto the glass through the partition wall, and
   channeling for returning air from the roller space to the first suction chamber.

9. A glass treatment furnace according to claim 8, wherein the channeling is provided through the partition wall.

10. A glass treatment furnace according to claim 9,
   wherein the partition wall includes blow openings for blowing air onto the glass from the second pressure chamber, and
   wherein the channeling includes longitudinal suction channels in the partition wall which open toward the glass and suction openings in the suction channels leading into the first suction chamber.

11. A glass treatment furnace according to claim 10, wherein between the suction channels there are radiation strips arranged in the partition wall which get hot from the heating elements and radiate onto the glass.

12. A glass treatment furnace according to claim 8, wherein the channeling bypasses the partition wall and proceeds along sides of the furnace.

13. A glass treatment furnace according to claim 12,
   wherein the partition wall includes blow openings for blowing air onto the glass from the second pressure chamber, and
   wherein the channeling includes longitudinal suction channels in the partition wall which open toward the glass and suction openings in the longitudinal suction channels leading into the first suction chamber.

14. A glass treatment furnace according to claim 13,
   wherein the partition wall is corrugated such that corrugations thereof form the longitudinal suction channels, and
   wherein the heating elements are positioned through the longitudinal suction channels such that a direct radiation heat is achieved onto the glass at least from some portions of the heating elements.

* * * * *